United States Patent [19]

Rueckl

[11] 4,259,120
[45] * Mar. 31, 1981

[54] COKE OVEN PATCHING AND SEALING MATERIAL

[75] Inventor: Roger L. Rueckl, Murrysville, Pa.

[73] Assignee: United States Steel Corporation, Pittsburgh, Pa.

[*] Notice: The portion of the term of this patent subsequent to Feb. 13, 1996, has been disclaimed.

[21] Appl. No.: 112,244

[22] Filed: Jan. 14, 1980

Related U.S. Application Data

[63] Continuation-in-part of Ser. No. 930,442, Aug. 2, 1978.

[51] Int. Cl.$^3$ .............................................. C04B 35/04
[52] U.S. Cl. ....................................... 106/58; 106/62; 106/65; 106/69; 106/84
[58] Field of Search ....................... 106/58, 62, 65, 69, 106/84, 85

[56] References Cited

U.S. PATENT DOCUMENTS

| | | | |
|---|---|---|---|
| 2,323,029 | 6/1943 | Goodrich | 106/84 |
| 2,429,872 | 10/1947 | Downs | 106/84 |

*Primary Examiner*—James Poer
*Attorney, Agent, or Firm*—Arthur J. Greif

[57] ABSTRACT

A patching composition for developing a superior bond with silica refractories at temperatures of 1200° to 2400° F. The composition comprises three basic components: (1) a high melting phase, e.g. silica brick, fireclay grog, magnesia or high alumina grain, (2) a bonding component, e.g. sodium silicate and (3) a low melting phase, e.g. window glass. It will generally be desirable to employ a fourth component for fluxing, such as soda ash or other alkaline earth compounds. The improved results are achieved by the use primarily, of a low melting phase such as window glass, bulb glass or lead glass having a softening point between about 900° and 1750° F. (482° to 954° C.), employed in an amount of about 6 to 25% of the total solids composition.

9 Claims, No Drawings

COKE OVEN PATCHING AND SEALING MATERIAL

BACKGROUND OF THE INVENTION

This application is a continuation-in-part of Ser. No. 930,442, filed Aug. 2, 1978.

After several years of operation, cracks and leaks often develop in the silica brick walls and roofs of coke ovens. Cracks in the oven walls are most common near the pusher and discharge ends of the ovens. The cracks are harmful in that they permit the passage of smoke emissions from the ovens to the flues and then to the battery stack. Cracks can also accelerate wall wear and cause hot spots that can result in the eventual shut-down of the oven. Effective oven sealing is now a virtual necessity to comply with existing or anticipated environmental demands. For a patching and sealing material to be effective, it should bond to the hot silica brick surface to which it is applied. Once applied the material must have thermal expansion characteristics that are compatible with the silica brick in order that spalling of the coating on heating or cooling does not result. A number of commercially available materials are presently used for coke oven patching and sealing, but with varying and often unacceptable degrees of effectiveness. This ineffectiveness of the commercially available materials is primarily caused by their inability to develop a coherent, strong ceramic bond with the surface to be patched, particularly at what may be termed the moderate temperatures (less than 2400° F.) that exist in coke ovens. U.S. Pat. No. 3,814,613, the disclosure of which is incorporated herein by reference disclosed a patching material which appeared to offer significantly improved bonding characteristics over the previously employed, commercially available patching materials. Thus, in laboratory tests employed to evaluate the bonding characteristics of such patching materials, the bonds formed by the '613 patented compositions appeared to show appreciable bonding under all test conditions. It has subsequently been found, however, that while the '613 patented composition was, in fact, superior in bonding to many commercially available materials; that its seemingly acceptable bonding (determined by laboratory test procedures) was not always borne-out in actual practice. As a result, new test procedures were developed. These new procedures were employed to evaluate a variety of patching mixtures and led to the finding that superior bonding under conditions similar to those encountered in coke ovens, could be achieved by the addition of a low melting phase, e.g. window glass, to the basic components (i.e. silicious aggregate and chemical binder) of the '613 patent.

A common laboratory test for evaluating the adherence of the coke oven patching materials, consisted of, at about room temperature, placing the patch of the material under evaluation between two pieces of used silica brick and firing the sandwich to various test temperatures. After such firing, adherence of the patch was based on the ease by which the two pieces of silica brick could be separated. It has now been determined, that the difference in application technique (factors which were considered insignificant) between these laboratory methods and those employed under actual service conditions did, in fact, lead to the poor correlatability of this test procedure. First, the mix under evaluation in the laboratory test was applied essentially dry, wherein in actual service it is most often applied as a slurry containing from 10 to 60 weight units of water for each 100 weight units of solids. Secondly, patching of coke-oven walls is most often effected by application (eg. pneumatic gunning) on hot walls, since permitting the ovens to cool down would generally be uneconomical and result both in the loss of time (lost production) and of valuable heat. Thus, patching materials will generally be applied to walls at a temperature of 1200° to 2400° F., although walls have, in some cases, been permitted to cool to temperatures as low as 500° F. Additionally, such testing did not adequately take into account the thermal cycling normally encountered by coke ovens. Thus, there was no extensive evaluation of the thermal expansion compatability of the patching material with that of the silica brick. Finally, and most importantly, ratings were based on the ease with which the silica bricks could be pulled apart. Thus, a potentially useful flux composition would be poorly rated if the bricks were easily pulled apart, even though the patch adhered well to one of the test bricks. To overcome such inadequacies, a new adherence test was developed which consisted of pouring a slurry mix of each material on a hot, horizontal slab of silica brick, i.e. four inches square by one inch thick. After thirty minutes in a horizontal position, the slabs are set vertical and either heated or cooled by changing the temperature in 100° F. increments. The tendency of the patching material to adhere to or to separate from the brick is then determined as a function of temperature at each of the 100° increments. Three separate material-adherence tests are shown in Table I. In two of the tests, cycles A and B respectively, the material to be evaluated was applied at either 1000° F. (538° C.) or 2000° F. (1093° C.) and cooled at such 100° F. increments. For the third test, cycle C, the test materials were applied at 1000° F. and the temperature thereafter raised to 2000° F. during which observations were made at 100° intervals. After reaching 2000° F., the furnace was permitted to cool to room temperature without any intermittent observations. Utilizing the above test procedure, the Table reports the results of a variety of commercially available patching materials (trade name omitted) in comparison with that of the '613 patent and of the instant invention.

TABLE I

Adherence Test Results

| Mix # | Principal Constituents[1] | Separation Temp. (° F.) for the Indicated Thermal Cycles | | |
|---|---|---|---|---|
| | | Cycle A | Cycle B | Cycle C |
| 1 | mullite, quartz, kaolinite | 200 | 2000 | (4) |
| 2 | quartz, kaolinite | 900 | 1500 | 1200 |
| 3 | quartz, mullite, kyanite | 300 | 1300 | 1000 |
| 4 | quartz, kyanite | 800 | 1900 | (4) |
| 5 | quartz, kyanite | 200 | 1200 | (4) |
| 6 | quartz, $(NH_4)H_2PO_4$, mullite, kaolinite | 200 | 1800 | (4) |
| 7 | pyrophyllite, quartz, kaolinite | 200 | 1500 | (4) |
| 8 | quartz, mullite, kaolinite | 300 | 1800 | 1200 |
| 9 | quartz, mullite, kyanite | ND | 1300 | 1000 |
| 10 | mullite, corundum, kyanite | 200 | 2000 | (4) |
| '613 Patent | | | | |
| 11 | quartz, Mn oxide, kaolinite | 700 | 1100 | 1200 |
| 12 | quartz, Mn oxide, kaolinite | 700 | 1100 | 1100 |
| Inven- | | | | |

TABLE I-continued

Adherence Test Results

| Mix # | Principal Constituents[1] | Separation Temp. (° F.) for the Indicated Thermal Cycles | | |
|---|---|---|---|---|
| | | Cycle A | Cycle B | Cycle C |
| tion | | | | |
| 13 | quartz, window glass, sodium silicate[2] | - Exhibited no failures, even when cooled to 70° F. | | |
| 14 | quartz, window glass, soda ash, sodium silicate[3] | | | |

[1]in order of decreasing concentration
[2]72% - 60 mesh silica brick, 18% - 100 mesh window glass, 10% sodium silicate
[3]63% - 60 mesh silica brick, 17% - 100 mesh window glass, 10% soda ash, 10% sodium silicate
[4]Adhered to 2000° F., but failed on cooling As seen from the Table, Product 1 adhered when applied at 1000° F. and remained on the silica brick slab whether it was thereafter cooled (cycle A) or heated (Cycle B) from that temperature. However, when applied at 2000° F. and cooled, separation occurred; with the coating falling off cleanly, indicating that adherence was achieved only by mechanical bonding. Product No. 2 exhibited essentially no adherence regardless of application temperature. Product No. 3 showed reasonable adherence when it was applied at 1000° F. or 2000° F. and cooled, but failed at 1000° F. when applied for the heat-up trials indicating, in addition to weak bond formation, a variability in such information. With the exception of the 1000° F. heat-up trial, Product No. 4 failed at or near the application temperature. Product No. 5 appeared to be one of the most versatile of the commercially available materials. It exhibited comparatively good mechanical adherence in the heatup tests; however, the coatings tended to remain relatively soft even at the 2000° F. test temperature, indicating susceptibility to abrasion. Equally important, this material failed, on cooling from 2000° C. in cycle C. Products 6 and 7 showed good adherence when applied at 1000° F., but rapid failure occurred during application of 2000° F. Product No. 8 exhibited good adherence only in the 1000° F. cool-down test, cycle A. Product No. 9 was not tested at 1000° F. Some mechanical bonding developed when it was applied at 2000° F. followed by cooling, but failure at 1300° F. in this cycle was complete and no residual particles adhered to the brick. Product No. 10 adhered quite well when applied at 1000° F. and cooled, but it failed almost immediately when applied at 2000° F. In cycle C partial failures occured during the cool-down as surface layers spalled off. However, a continuous layer of hard, firmly adhering coating remained on the test slab even at room temperature. The two mixes (Product Nos. 11 and 12) falling within the scope of the '613 patent showed poor adherence when applied at 1000° F., but these latter two were superior to the other prior-art mixtures when applied at 2000° F. and exhibited some degree of ceramic bonding at this application temperature. In rather dramatic contrast with even the best of the above prior-art mixes, the instant invention (products 13 and 14) showed no failure in any of the three cycles, even when cooled to room temperature.

The patching composition of the instant invention will be composed of the following main phases: (i)—A pre-fired high melting phase, primarily composed of silica, magnesia, alumina and combinations thereof, preferably ground silica brick or ground used silica brick. This phase may be employed in amounts of from about 55 to 80 weight percent of the total composition, with a range of 65 to 75% being most preferred. (ii)—From 5 to 15% of a bonding phase (preferably 8 to 11%) which can be any of a number of chemical binders utilized in the ceramics industry such as sodium silicate, sodium phosphate, phosphoric acids, which binders can be utilized in either solid or liquid form. (iii)—From 10 to 25%, desirably 10 to 20%, of a low-melting phase derived from any of a number of glasses, such as window glass, bulb glass or lead glass. These glasses will have a softening point (as determined by ASTM Standard Test C338-73) between 900° and 1750° F., and preferably between 1200° and 1500° F. In many instances it will further be desirable to employ (iv)—a phase composed of a fluxing agent, which may be any of a number of alkali or alkaline-earth compounds such as soda ash or razorite. If employed, this phase may be employed in amounts of from 1 to 12%, but generally will be less than 8% of the total composition, desirably within a range of 2 to 5%. When the composition is designed to be applied by troweling, plastic clay, eg. hydrated aluminum silicate, may be added in amounts up to about 15% to make the mix more workable. Because of the strong fusion bond developed between the silica brick and the patching material, it is desirable that at least 90% of the high temperature phase be minus 10 mesh, and preferably minus 60 mesh. Through fine sizing, a thin uniform coating can be applied with proper application procedures. It is further desirable that the low melting phase and the fluxing phase (if employed) be of a size finer than that of the more refractory phases, so as to promote a more even distribution of these lower melting phases. Thus, when the particle sizes of the refractory phases are at the high end (−10 mesh) of the size range, 90% of the glass and the fluxing phases will desirably be minus 20 mesh. Similarly, when the refractory phases are employed at low end of the size range, at least 90% of the lower melting phases will desirably be finer than 100 mesh.

I claim:

1. A composition for the production of mixes useful for the patching and sealing of refractory structures which are subject to thermal cycling, such composition consisting essentially of, on a dry basis, the following components,
   a. 55 to 80% of a high melting phase, selected from the group consisting of (i) silica, (ii) magnesia, (iii) alumina or (iv) combinations thereof,
   b. 5 to 15% of a binder phase, and
   c. 10 to 20% of a glass having a softening point between 900° and 1750° F., wherein at least 90% of said components are finer than 10 mesh.

2. The composition of claim 1, in which said high melting phase is siliceous.

3. The composition of claim 2, in which said components are employed within the range,
   a. 65 to 75% siliceous phase, at least 90% of which is finer than 60 mesh,
   b. 8 to 11% binder, and
   c. 10 to 20% glass, at least 90% of which is finer than 100 mesh.

4. The composition of claims 1 or 2, containing from 1 to 12% of a fluxing agent, at least 90% of which is finer than 20 mesh.

5. The composition of claim 3, containing from 2 to 5% of a fluxing agent, at least 90% of which is finer than 100 mesh.

6. A method for the patching and sealing of cracks in coke ovens, which comprises applying to such cracks a patching material consisting essentially of, a first fraction composed of, on a dry basis,
 a. 55 to 80% of a high melting phase, selected from the group consisting of (i) silica, (ii) magnesia, (iii) alumina or (iv) combinations thereof,
 b. 5 to 15% of a binder phase, and
 c. 10 to 20% of a glass phase having a softening point between 900 and 1750° F.,
wherein at least 90% of each of a., b. and c. are finer than 10 mesh, and
a second fraction consisting essentially of 10 to 60 weight units of water for each 100 weight units of said first fraction.

7. The method of claim 6, in which said high melting phase is siliceous.

8. The method of claim 6, wherein said first fraction consists essentially of,
 a. 65 to 75% siliceous phase, at least 90% of which is finer than 60 mesh,
 b. 8 to 11% binder, and
 c. 10 to 20% glass, at least 90% of which is finer than 100 mesh.

9. The method of claims 7 or 8 wherein the cracks and surrounding oven walls are at a temperature of 1200° to 2400° F. when said patching material is applied.

* * * * *